(12) United States Patent
Suzuki et al.

(10) Patent No.: US 9,783,225 B2
(45) Date of Patent: Oct. 10, 2017

(54) ELECTRIC POWER STEERING DEVICE

(71) Applicants: JTEKT CORPORATION, Osaka-shi, Osaka (JP); TOYOTA JIDOSHA KABUSHIKI KAISHA, Toyota-shi, Aichi-ken (JP)

(72) Inventors: Hiroaki Suzuki, Toyota (JP); Shingo Ougita, Toyota (JP); Tatsuya Kawai, Anjo (JP); Toshinobu Maeda, Okazaki (JP); Naohiro Sato, Okazaki (JP); Yasutaka Fukumoto, Toyota (JP)

(73) Assignees: JTEKT CORPORATION, Osaka (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/967,900

(22) Filed: Dec. 14, 2015

(65) Prior Publication Data

US 2016/0176438 A1    Jun. 23, 2016

(30) Foreign Application Priority Data

Dec. 22, 2014   (JP) ................ 2014-259010

(51) Int. Cl.
*B62D 5/04* (2006.01)
(52) U.S. Cl.
CPC ......... *B62D 5/0403* (2013.01); *B62D 5/0409* (2013.01); *B62D 5/0454* (2013.01); *B62D 5/043* (2013.01)
(58) Field of Classification Search
CPC ... B62D 5/0403; B62D 5/0409; B62D 5/0454
See application file for complete search history.

(56) References Cited

U.S. PATENT DOCUMENTS

| 1,843,875 | A | 2/1932 | Kendall et al. | |
| 6,745,865 | B2 * | 6/2004 | Hama | H02K 5/148 180/444 |
| 8,561,753 | B2 * | 10/2013 | Ishige | B62D 5/0409 180/443 |
| 8,863,888 | B2 * | 10/2014 | Ochiai | B62D 5/0403 180/444 |
| 2002/0112555 | A1 | 8/2002 | Chikaraishi et al. | |

(Continued)

FOREIGN PATENT DOCUMENTS

| DE | 19811784 A1 | 9/1999 |
| DE | 10192745 B4 | 3/2007 |

(Continued)

OTHER PUBLICATIONS

Apr. 20, 2016 Extended Search Report issued in European Patent Application No. 15201277.9.

*Primary Examiner* — Kevin Hurley
(74) *Attorney, Agent, or Firm* — Oliff PLC

(57) ABSTRACT

An electric power steering device includes a restricting portion that is provided on at least one of surfaces of a housing and a worm wheel, the surfaces facing each other. The restricting portion is configured to restrict movement of the worm wheel to maintain a meshing relationship between a worm and the worm wheel that allows torque transmission between the worm and the worm wheel, when fixing of the worm wheel to an output shaft of a power assist actuator in an axial direction of the output shaft is released and the worm wheel is moved in the axial direction.

2 Claims, 5 Drawing Sheets

(56) References Cited

U.S. PATENT DOCUMENTS

| | | | |
|---|---|---|---|
| 2006/0191739 A1* | 8/2006 | Koga | B62D 5/0463 180/446 |
| 2006/0213717 A1* | 9/2006 | Chikaraishi | B62D 5/0409 180/444 |
| 2008/0035413 A1* | 2/2008 | Segawa | B62D 6/10 180/444 |
| 2012/0241246 A1 | 9/2012 | Kuroumaru | |
| 2014/0139207 A1 | 5/2014 | Nakamura et al. | |

FOREIGN PATENT DOCUMENTS

| | | | |
|---|---|---|---|
| EP | 1887254 A2 | 2/2008 | |
| GB | 762032 A | 11/1956 | |
| JP | 2014/102145 A | 6/2014 | |
| JP | 2014/156177 A | 8/2014 | |

\* cited by examiner

ELECTRIC POWER STEERING DEVICE

INCORPORATION BY REFERENCE

The disclosure of Japanese Patent Application No. 2014-259010 filed on Dec. 22, 2014 including the specification, drawings and abstract is incorporated herein by reference in its entirety.

BACKGROUND OF THE INVENTION

1. Field of the Invention

The invention relates to an electric power steering device.

2. Description of Related Art

A conventional column-assist type electric power steering device (which is hereinafter referred to as "EPS") that is tiltable will be described with reference to FIG. 5. The EPS includes a steering column 100 and a steering shaft 102 that is rotatably inserted in the steering column 100, and a housing 104 is integrally connected to a front part of the steering column 100.

The housing 104 has an axial hole 106 in which an output shaft 108, which constitutes a part of the steering shaft 102, is rotatably supported via bearings 110, 112 and 114. A worm wheel 116 is attached to and press-fitted to the output shaft 108 such that the worm wheel 116 is unable to rotate relative to the output shaft 108, for example, through a key connection, and the worm wheel 116 meshes with a worm 118 that is connected to an output shaft of a motor (not shown). The bearings 110, 112 and 114 are attached to the axial hole 106 by press-fitting.

Thus, the steering force that is generated when a driver operates a steering wheel (not shown) that is connected to the steering shaft 102 is transmitted via the steering shaft 102 to the output shaft 108 and then to steered wheels (not shown) via, for example, a rack-and-pinion steering device. In addition, the rotary force of the motor is transmitted via the worm 118 and the worm wheel 116 to the output shaft 108. As a result, by appropriately controlling the rotary force and direction of rotation of the motor, appropriate steering assisting torque can be provided to the output shaft 108 to achieve power assistance.

An electric power steering device that has the above-described structure, which is described in, for example, Japanese Patent Application Publication No. 2014-156177 (JP 2014-156177 A), is known.

When a steered wheel (tire) goes up onto a curb or the like violently while the vehicle is running, the motor and the steering wheel receive an excessive reverse input from the steered wheel and are rotated at a high speed. When an excessive reverse input is applied as described above, the worm wheel, which is connected to the output shaft by press-fitting, may be released from the output shaft and moved in an axial direction of the output shaft. When the worm wheel and the worm are disengaged from each other as a result of the movement of the worm wheel, there is a possibility that the electric power steering device becomes unable to provide power assistance.

SUMMARY OF THE INVENTION

The invention provides an electric power steering device that does not become unable to provide power assistance even when fixing of a worm wheel to an output shaft is released.

An electric power steering device according to an aspect of the invention includes a power assist actuator that includes a motor and a worm reducer; and a restricting portion. The worm reducer includes a worm that is connected to a drive shaft of the motor, a worm wheel that meshes with the worm and is attached to an output shaft of the power assist actuator such that the worm wheel is unable to rotate relative to the output shaft, and a housing that accommodates the worm wheel. The electric power steering device is configured to provide power assistance via the output shaft. The restricting portion is provided on at least one of surfaces of the housing and the worm wheel, the surfaces facing each other. The restricting portion is configured to restrict movement of the worm wheel to maintain a meshing relationship between the worm and the worm wheel that allows torque transmission between the worm and the worm wheel, when fixing of the worm wheel to the output shaft in an axial direction of the output shaft is released and the worm wheel is moved in the axial direction.

An aspect of the invention relates to an electric power steering device including a power assist actuator that includes a motor and a worm reducer. The worm reducer includes a worm that is connected to a drive shaft of the motor, a worm wheel that meshes with the worm and is attached to an output shaft of the power assist actuator such that the worm wheel is unable to rotate relative to the output shaft, and a housing that accommodates the worm wheel. The electric power steering device is configured to provide power assistance via the output shaft. The electric power steering device includes a restricting portion that is provided on at least one of surfaces of the housing and the worm wheel, the surfaces facing each other. The restricting portion is configured to restrict movement of the worm wheel to maintain a meshing relationship between the worm and the worm wheel that allows torque transmission between the worm and the worm wheel, when fixing of the worm wheel to the output shaft in an axial direction of the output shaft is released and the worm wheel is moved in the axial direction.

A bearing may be provided in the housing, and the bearing may support the output shaft such that the output shaft is rotatable; and the restricting portion may be provided at least on an inner surface of the housing that faces one axial side surface of the worm wheel, and the restriction portion may be located closer to the one axial side surface than the bearing is.

The restricting portion may be a projecting portion that projects from at least one axial side surface of the worm wheel toward an inner surface of the housing.

According to the above-mentioned aspect of the invention, the restricting portion restricts movement of the worm wheel in the axial direction of the output shaft to maintain the meshing relationship between the worm and the worm wheel that allows torque transmission therebetween. Thus, even when the fixing of the worm wheel to the output shaft is released, the electric power steering device does not become unable to provide power assistance.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
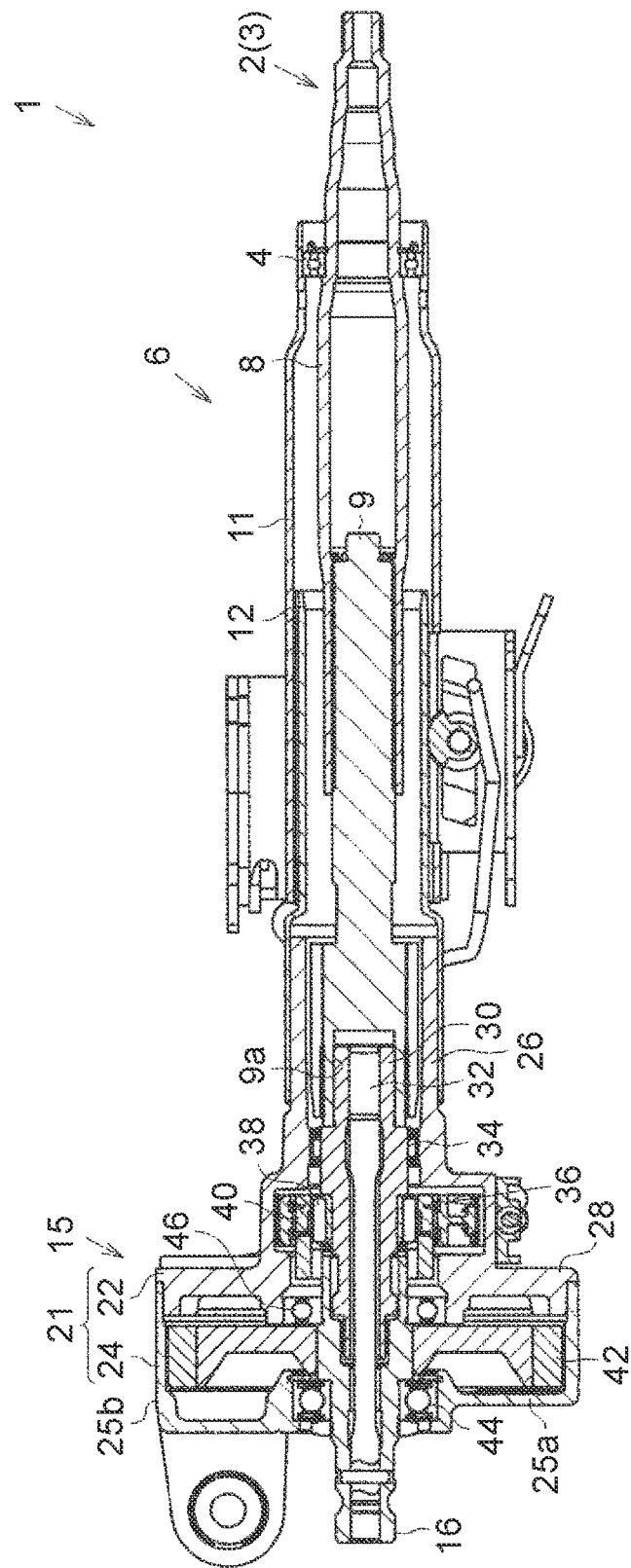
FIG. 1 is a sectional view of a steering column and a vicinity of the steering column of an electric power steering device according to one embodiment.

An electric power steering device (which will be hereinafter referred to as "EPS") 1 according to an embodiment of the invention will be described with reference to FIG. 1 through FIG. 3. As shown in FIG. 1, the EPS 1 includes a steering shaft 2 that has a column shaft 3, as its input side end portion, which is rotatably accommodated in a steering column 6 via a bearing 4. A steering wheel (not shown) is fixed to one end (a right end portion in FIG. 1) of the steering shaft 2. The other end (a left end portion in FIG. 1) of the steering shaft 2 is connected to an intermediate shaft (not shown) via a universal joint, and rotation and steering torque that result from a steering operation thereof are transmitted to a steering mechanism (not shown), such as a steering gear (rack-and-pinion mechanism), which changes the steering angle of steered wheels.

The column shaft 3 includes a hollow upper shaft 8 to which the steering wheel is fixed to constitute a steering side end portion of the column shaft 3, and a lower shaft 9 that is spline-fitted to the upper shaft 8 to allow sliding movement of the upper shaft 8 in an axial direction. The steering column 6 includes an outer tube 11 that accommodates and supports the upper shaft 8 via the bearing 4, and an inner tube 12 that accommodates the lower shaft 9. The inner tube 12 is inserted in the outer tube 11, and the outer tube 11 is provided so as to be slidable in the axial direction relative to the inner tube 12.

The EPS 1 is constituted as a column-type EPS. The column shaft 3 of this embodiment is formed by connecting an output shaft 16 of a power assist actuator 15 to the other end of the lower shaft 9 that is connected to the upper shaft 8 as described above.

A housing 21 is attached and fixed to a front end portion of the outer tube 11. The housing 21 includes a sensor accommodating housing portion 22 that is attached to the inner tube 12, and a mechanism accommodating housing portion 24 that is attached and fixed to the sensor accommodating housing portion 22.

The sensor accommodating housing portion 22 has a cylindrical tube portion 26 that has one end that is fixedly fitted in an end portion of the inner tube 12, and an enlarged-diameter portion 28 that is formed to have an enlarged diameter at the other end of the tube portion 26. The mechanism accommodating housing portion 24 is a housing that accommodates the power assist actuator 15, which provides steering assist force to the steering shaft 2. As shown in FIG. 2, the mechanism accommodating housing portion 24 includes a bottomed cylindrical worm wheel accommodating portion 25 that includes a bottom wall 25a and a peripheral wall 25b that extends from a circumferential portion of the bottom wall 25a. The mechanism accommodating housing portion 24 supports a motor (not shown) as a driving source for the power assist actuator 15 and a controller (not shown) that controls the motor.

The enlarged-diameter portion 28 is formed to have a cylindrical shape including a bottom wall 28a and a peripheral wall 28b that extends from the bottom wall 28a. The peripheral wall 28b is formed to have a height which is smaller than that of the peripheral wall 25b of the worm wheel accommodating portion 25, and a distal end portion of the peripheral wall 25b is fitted to an outer periphery of the peripheral wall 28b.

Figure 2:
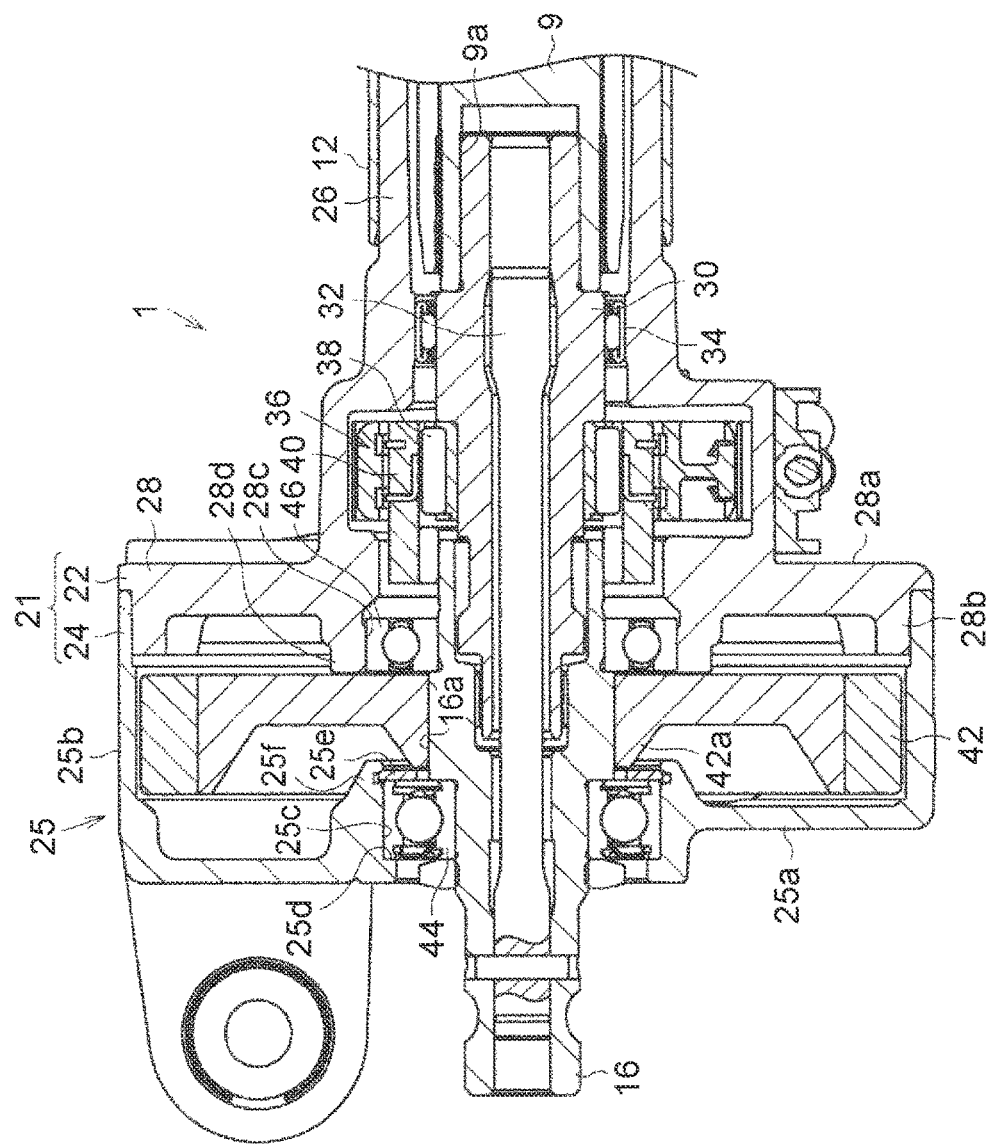
FIG. 2 is a sectional view of a worm wheel and a vicinity of the worm wheel in a reducer of the electric power steering device.

As shown in FIG. 1 and FIG. 2, the lower shaft 9 includes a hollow spline fitting portion 9a at an end portion on the housing 21-side. A connecting member 30 is inserted in and connected to the spline fitting portion 9a such that the connecting member 30 is unable to rotate relative to the spline fitting portion 9a, and one end of a torsion bar 32 that is inserted through the connecting member 30 is fixed to the spline fitting portion 9a. The other end portion of the torsion bar 32 is connected to the output shaft 16 such that the other end portion of the torsion bar 32 is unable to rotate relative to the output shaft 16.

As shown in FIG. 2, the connecting member 30 is supported by the sensor accommodating housing portion 22 via a bearing 34 that is disposed on an inner periphery of the tube portion 26. The torsion bar 32 is twisted in accordance with steering torque from the steering wheel (not shown), which is given by the driver, and the amount of twist of the torsion bar 32 is detected by a torque sensor 36 that is disposed around the connecting member 30 as shown in FIG. 2.

The torque sensor 36 is constituted by a magnet 38 that is fixed to an outer periphery of the connecting member 30, and a magnetic sensor (Hall IC) 40 that is located at a position facing the magnet 38 on an inner periphery of the tube portion 26 to detect a change in magnetic flux of the magnet 38. The torque sensor 36 detects the steering torque that is transmitted via the steering shaft 2 (column shaft 3) by detecting an angle of twist between the connecting member 30 and the output shaft 16, in other words, twist of the torsion bar 32, as a change in magnetic flux with the use of the magnetic sensor 40. An output signal from the torque sensor 36 is output to the controller (not shown), and the controller supplies a motor current in accordance with the steering torque to the motor (not shown).

As shown in FIG. 2, the output shaft 16 is rotatably supported by the housing 21 via a bearing 44 that is provided on the bottom wall 25a of the worm wheel accommodating portion 25 and a bearing 46 that is provided on the bottom wall 28a of the enlarged-diameter portion 28. The bearing 44 is press-fitted from inside into a mounting hole 25c with a step portion 25d that is provided in a boss 25f that bulges inward in the bottom wall 25a until the bearing 44 engages with the step portion 25d, and a C-shaped snap ring 25e is fitted in a circumferential groove in an inner surface of the mounting hole 25c. Thus, the bearing 44 is prevented from falling off in the axial direction of the output shaft 16.

The bottom wall 28a of the enlarged-diameter portion 28 has a boss 28d, and the bearing 46 is press-fitted from inside into a mounting hole 28c that is provided in the boss 28d. A hole of the mounting hole 28c, which communicates with the torque sensor 36-side, has a diameter that is smaller than the outside diameter of an outer ring of the bearing 46.

A bulged portion 16a that has a diameter that is larger than the inside diameters of inner rings of the bearings 44 and 46 is formed at a portion of the output shaft 16 corresponding to the worm wheel accommodating portion 25. As shown in FIG. 3, an end portion of the bulged portion 16a that faces the bearing 44 contacts the inner ring of the bearing 44, and an end portion of the bulged portion 16*a* that faces the bearing 46 contacts the inner ring of the bearing 46.

Figure 3:
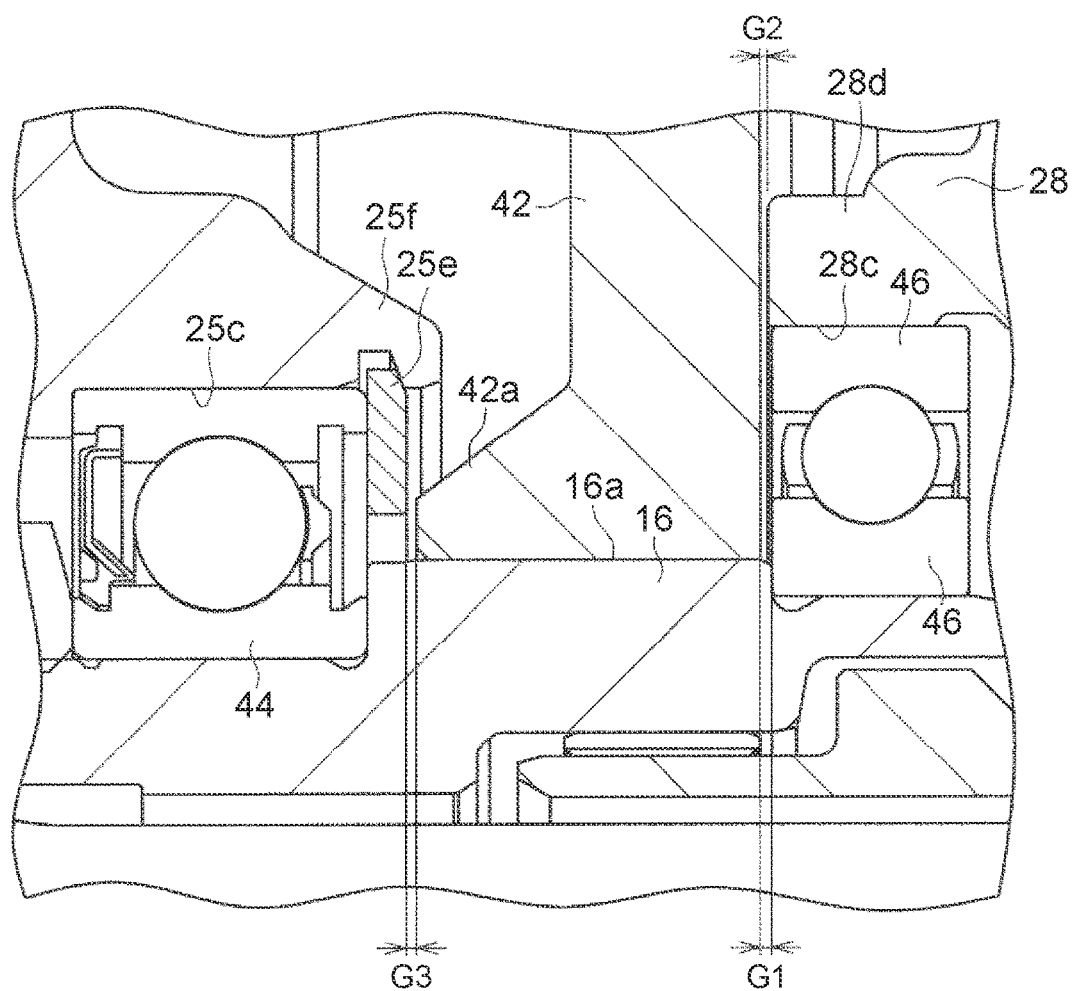
FIG. 3 is an explanatory view of gaps G1, G2 and G3.

As shown in FIG. 1 to FIG. 3, a worm wheel 42 is attached to the bulged portion 16*a* of the output shaft 16 such that the worm wheel 42 is unable to rotate relative to the bulged portion 16*a*, by a fixing portion such as a key connection. The fixing portion is a concept that includes press-fitting. The worm wheel 42 is fixed to the bulged portion 16*a* by the fixing portion, such as a key connection, unless an excessive external force is input.

The motor includes a drive shaft to which a worm 118 is attached, and the worm meshes with the worm wheel 42. The worm, shown in FIG. 5, meshes with the worm wheel 116 (corresponding to worm wheel 42 in FIG. 4). The worm 118 is represented by a schematic illustration in FIG. 4. The worm and the worm wheel 42 constitute a worm reducer. The power assist actuator 15 is constituted by the motor and the worm reducer.

As shown in FIG. 3, a gap G2 between the boss 28*d* of the enlarged-diameter portion 28 and the worm wheel 42 is set to be shorter than a gap G1 between the worm wheel 42 and the bearing 46. As shown in FIG. 2 and FIG. 3, a thick portion 42*a* that has a larger axial thickness is formed at a portion of the worm wheel 42 through which the output shaft 16 extends. A distal end of the thick portion 42*a* and the snap ring 25*e* on the bearing 44-side are set and disposed to have a gap G3 therebetween.

The gaps G2 and G3 provide spaces in which the worm wheel 42 is allowed to move in the axial direction on the bulged portion 16*a* if the worm wheel 42 and the output shaft 16, which have been fixed to each other in the axial direction by a fixing portion such as a key connection, are released from each other (i.e., if the fixing of the worm wheel 42 to the output shaft 16 in the axial direction by a fixing portion such as a key connection is released). In other words, when the worm wheel 42 is moved toward the bearing 44 in FIG. 3, the gap G3 provides a space in which the thick portion 42*a* can be moved until the thick portion 42*a* contacts the snap ring 25*e*. The gap G2 provides a space in which the worm wheel 42 can be moved until a side surface of the worm wheel 42 that faces the bearing 46 contacts the boss 28*d* when the worm wheel 42 is moved toward the bearing 46.

The lengths of the gaps G2 and G3 in the axial direction are set such that the worm and the worm wheel 42 maintain a meshing relationship that allows torque transmission therebetween even when the worm wheel 42 is moved by the length of the gap G2 or the gap G3. Here, the boss 28*d* and the snap ring 25*e* correspond to restricting portions. Although the lengths of the gaps G2 and G3 in the axial direction depend on the sizes and shapes of the worm and worm wheel, each of the lengths of the gaps G2 and G3 in the axial direction is around 1 mm in this embodiment. This value is an example and each of the lengths is not limited to the value.

In the power assist actuator 15, the speed of rotation of the motor (not shown) is reduced with the use of the reducer that is constituted by the worm wheel 42 and the worm (not shown), and the rotation is transmitted to the output shaft 16 of the power assist actuator 15. Thus, the power assist actuator 15 is able to provide power assistance to the steering system.

(Effects of embodiment) The effects of the EPS 1 that is constituted as described above will be described. When a steered wheel (tire) goes up onto a curb or the like violently while the vehicle is running, the motor and the steering wheel (not shown) receive an excessive reverse input from the steered wheel and are rotated at a high speed. When an excessive reverse input (in other words, external force) is applied as described above, the worm wheel 42, which is connected to the output shaft 16, may be released from the output shaft 16 and may be moved in the axial direction of the output shaft 16.

In this case, when the worm wheel 42 is moved leftward (in the axial direction) in FIG. 3, the movement of the worm wheel 42 is restricted when the thick portion 42*a* contacts the snap ring 25*e* after the worm wheel 42 is moved by the length of the gap G3. Thus, even if the worm wheel 42 is moved, the worm and the worm wheel 42 maintain the meshing relationship that allows torque transmission therebetween (in other words, the worm and the worm wheel 42 are maintained in a state in which the worm and the worm wheel 42 mesh with each other such that torque is allowed to be transmitted between the worm and the worm wheel 42).

When the worm wheel 42 is moved rightward (in the axial direction) in FIG. 3, the movement of the worm wheel 42 is restricted when a side surface of the worm wheel 42, which faces the bearing 46, contacts the boss 28*d* after the worm wheel 42 is moved by the length of the gap G2. Thus, even if the worm wheel 42 is moved, the worm and the worm wheel 42 maintain the meshing relationship that allows torque transmission therebetween.

As a result, it is possible to prevent occurrence of a situation in which power assistance cannot be provided due to disengagement of the worm wheel 42 and the worm from each other. Thus, there is an advantage that the vehicle can be steered even if the worm wheel 42 is moved in the axial direction relative to the output shaft 16 and thus the worm wheel 42 is not fixed to the output shaft 16 in the axial direction. Accordingly, the vehicle can be steered in an emergency.

This embodiment has the following features. (1) The EPS 1 of this embodiment includes the boss 28*d* and the snap ring 25*e* (restricting portions), which restrict movement of the worm wheel 42 to maintain the meshing relationship between the worm and the worm wheel 42 that allows torque transmission therebetween when the worm wheel 42 is moved in the axial direction of the output shaft 16.

As a result, when the worm wheel 42 is moved in the axial direction of the output shaft 16, the boss 28*d* and the snap ring 25*e* (restricting portions) restrict the movement of the worm wheel 42 in the axial direction of the output shaft 16 to maintain the meshing relationship between the worm and the worm wheel 42 that allows torque transmission between the worm and the worm wheel 42. Thus, even when the worm wheel 42 and the output shaft 16, which have been fixed by press-fitting, are released from each other (i.e., even when the fixing of the worm wheel 42 to the output shaft 16 by press-fitting is released), the EPS 1 does not become unable to provide power assistance.

(2) In the EPS 1 of this embodiment, the bearing 46 is provided in the housing 21, the bearing 46 supporting the output shaft 16 such that the output shaft 16 is rotatable. In addition, the boss 28*d* (restricting portion) of the bottom wall 28*a* is provided in an inner surface of the housing 21 that faces one axial side surface of the worm wheel 42 (i.e., one side surface in the axial direction), and the boss 28*d* is located closer to the one axial side surface of the worm wheel 42 than the bearing 46 is. In other words, the boss 28*d* protrudes toward the one axial side surface of the worm wheel 42.

As a result, in this embodiment, when the worm wheel 42 is moved toward the bearing 46, the movement of the worm wheel 42 in the axial direction of the output shaft 16 is restricted to maintain the meshing relationship between the worm and the worm wheel 42 that allows torque transmission therebetween.

Even if the worm wheel 42 and the output shaft 16, which have been fixed to each other by press-fitting, are released from each other (i.e., even if the fixing of the worm wheel 42 to the output shaft 16 by press-fitting is released) when the worm wheel 42 is moved toward the bearing 46, the EPS 1 does not become unable to provide power assistance.

The invention is not limited to the embodiment and may be modified as follows. Although the boss 28d is the restricting portion in the embodiment, the restricting portion is not limited to the boss 28d. In exchange for reducing the height of the boss 28d, a projecting portion having a height from the bottom wall 28a that is greater than that of the boss 28d may be formed as a restricting portion. In this case, the projecting portion and the worm wheel 42 are formed to have a gap G2 therebetween. The shape of the projecting portion and the number of the projecting portions are not limited. For example, the projecting portion may be formed in a cylindrical shape that surrounds the boss 28d or a plurality of projecting portions may be arranged around the boss 28d at predetermined regular pitches or irregular pitches.

Figure 4:
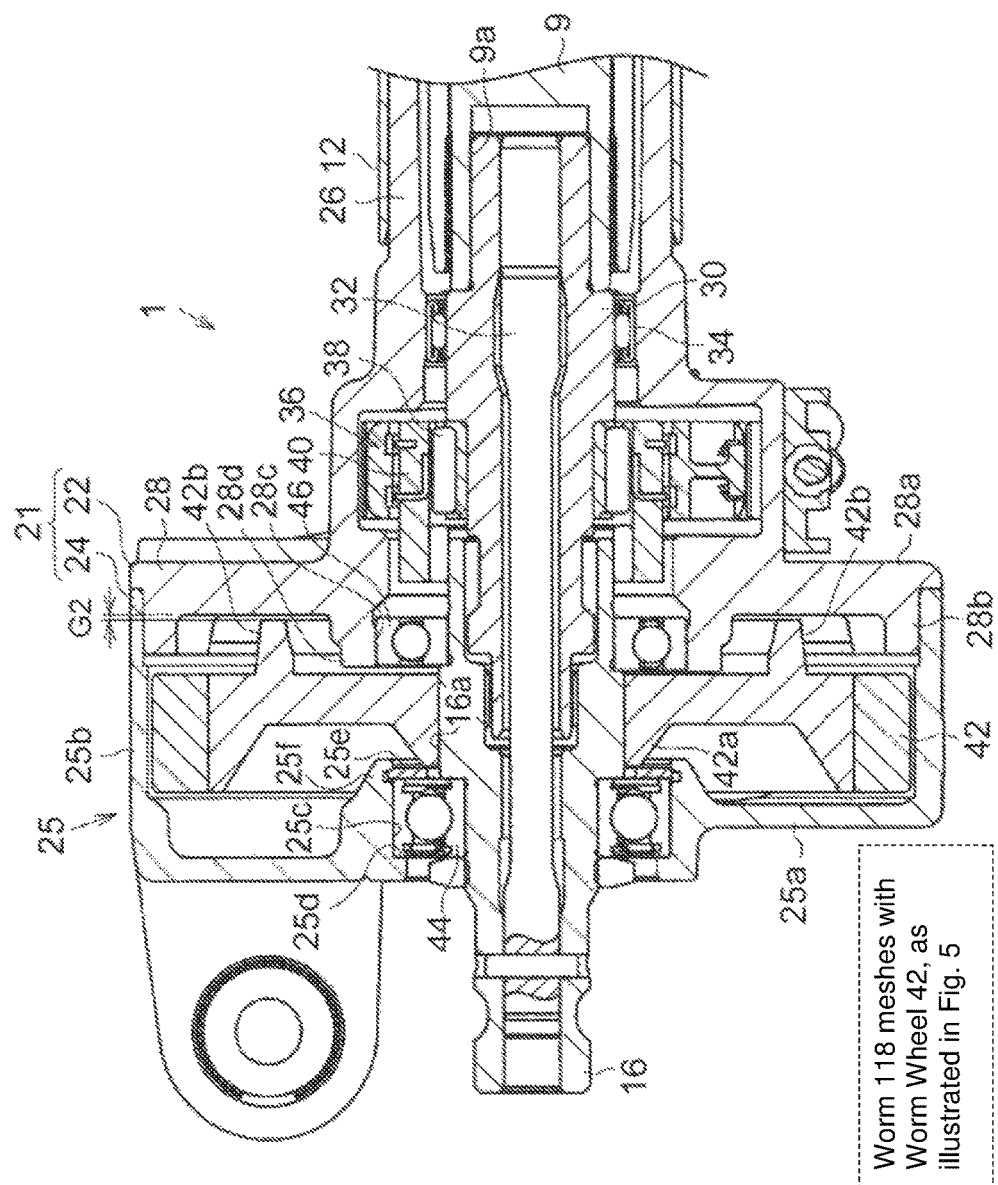
FIG. 4 is a sectional view of a worm wheel and a vicinity of the worm wheel in a reducer of an electric power steering device according to another embodiment.
Figure 5:
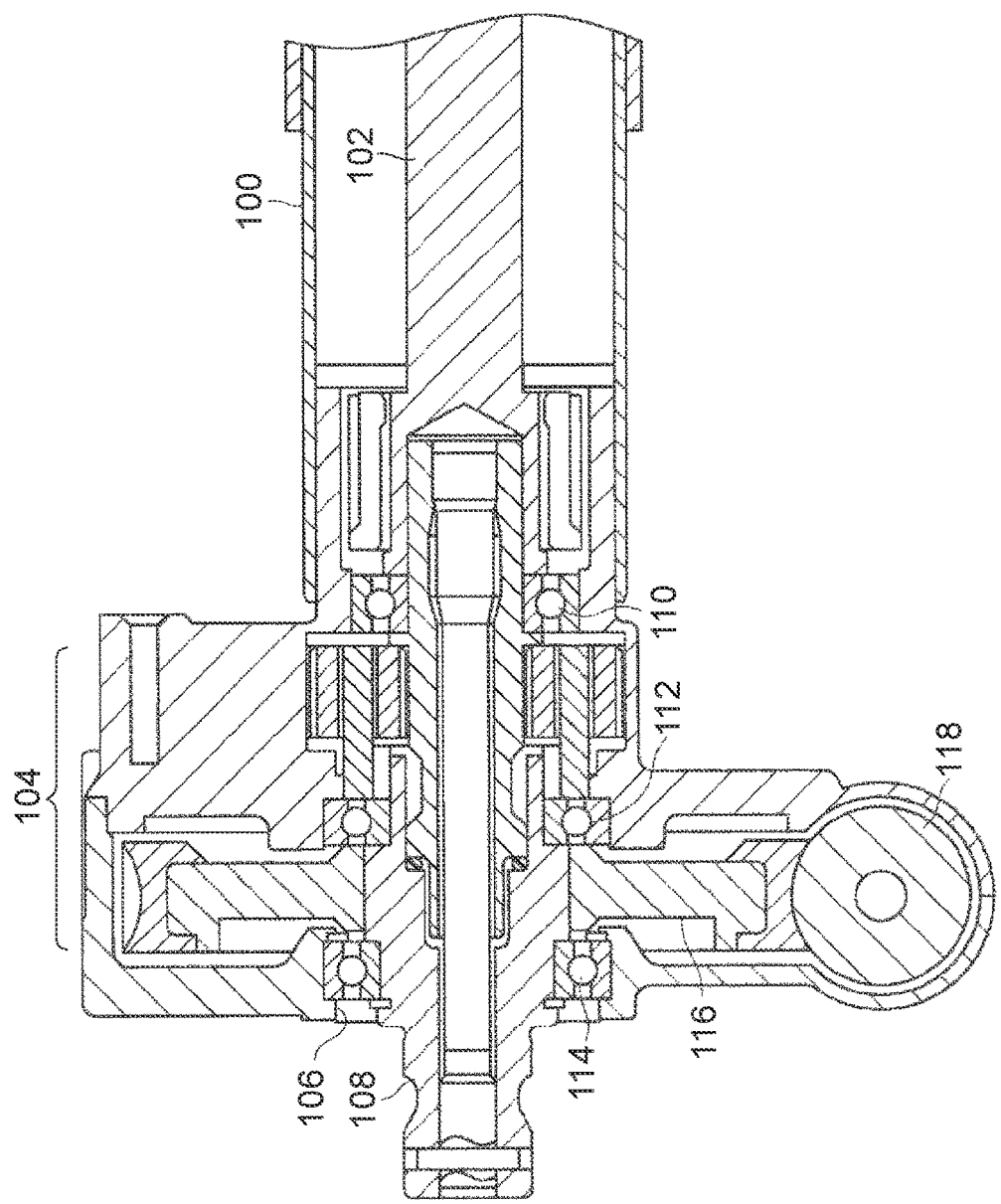
FIG. 5 is a sectional view of a worm wheel and a vicinity of the worm wheel of a reducer of an electric power steering device in related art.

When a projecting portion is formed in a cylindrical shape that surrounds the boss 28d, it is preferred that the entire end face of the projecting portion be flush. Instead of providing the projecting portion on the bottom wall 28a, a projecting portion 42b as a restricting portion may be provided on the worm wheel 42 with a gap G2 between the projecting portion 42b and the bottom wall 28a as shown in FIG. 4. Alternatively, projecting portions that can contact each other may be respectively provided as restricting portions on the worm wheel 42 and the bottom wall 28a.

The shape of the projecting portion 42b and the number of the projecting portions 42b are not limited. For example, the projecting portion 42b may be formed in a cylindrical shape that surrounds the boss 28d (refer to FIG. 4), or a plurality of projecting portions 42b may be arranged around the boss 28d at predetermined regular pitches or irregular pitches.

The projecting portion that is provided on the worm wheel 42 may be provided on a side surface that faces the bottom wall 25a instead of being provided to face the bottom wall 28a. Alternatively, the projecting portion 42b may be provided on the side surface that faces the bottom wall 28a with another projecting portion provided on the side surface of the worm wheel 42 that faces the bottom wall 25a.

In any case, a gap G3 is provided between the bottom wall 25a and the projecting portion that is provided on the side surface of the worm wheel 42 that faces the bottom wall 25a. Also, in this case, a gap that is greater than the gap G3 is provided between the thick portion 42a and the snap ring 25e.

In the embodiment, the boss 28d of the bottom wall 28a is provided on the inner surface of the sensor accommodating housing portion 22 (the housing 21) that faces one axial side surface of the worm wheel 42, and the boss 28d is located closer to the one axial side surface of the worm wheel 42 than the bearing 46 is.

In addition to this configuration, on the side of the bearing 44, which faces the other axial side surface of the worm wheel 42 (i.e., the other side surface of the worm wheel 42 in the axial direction), the boss 25f of the bottom wall 25a may be located closer to the other axial side surface of the worm wheel 42 than the bearing 44 is, and a gap G3 may be provided between the boss 25f and the other axial side surface of the worm wheel 42. In this case, a gap that is greater than the gap G3 is provided between the thick portion 42a and the snap ring 25e.

In the embodiment, a snap ring may be used to prevent the bearing 46 from coming out of the mounting hole 28c as in the case of the bearing 44. While the invention is implemented as a column type electric power steering device (EPS) in the embodiment, this invention may be implemented as a pinion assist type or dual pinion assist type EPS, for example.

What is claimed is:

1. An electric power steering device comprising:
a power assist actuator that includes a motor and a worm reducer, the worm reducer including a worm that is connected to a drive shaft of the motor, a worm wheel that meshes with the worm and is axially attached to an output shaft of the power assist actuator by press-fitting such that the worm wheel is unable to rotate relative to the output shaft, and a housing that accommodates the worm wheel, and the electric power steering device being configured to provide power assistance via the output shaft;
a restricting portion that is provided on at least one of surfaces of the housing and the worm wheel, the surfaces facing each other, and the restricting portion being configured to restrict movement of the worm wheel to maintain a meshing relationship between the worm and the worm wheel that allows torque transmission between the worm and the worm wheel, when fixing of the worm wheel to the output shaft, by press-fitting of the worm wheel to the output shaft, in an axial direction of the output shaft is released and the worm wheel is moved in the axial direction;
a bearing is provided in the housing, and the bearing supports the output shaft such that the output shaft is rotatable; and
the restricting portion is provided at least on an inner surface of the housing that faces one axial side surface of the worm wheel, and the restriction portion is located closer to the one axial side surface than the bearing is.

2. The electric power steering device according to claim 1, wherein the restricting portion is a boss that protrudes toward the one axial side surface of the worm wheel.

* * * * *